3 Sheets—Sheet 1.

J. W. BATES & R. BORGERSRODE.
ANIMAL-TRAP.

No. 180,315. Patented July 25, 1876.

WITNESSES
Henry N. Miller
C. L. Evert

INVENTORS,
J. W. Bates, R. Borgersrode,
By Alexander Munson
Attorneys

3 Sheets—Sheet 2.

J. W. BATES & R. BORGERSRODE.
ANIMAL-TRAP.

No. 180,315. Patented July 25, 1876.

WITNESSES
Henry N. Miller
C. L. Evert

INVENTORS
J. W. Bates, R. Borgersrode.
By Alexander Mason
Attorneys.

N. PETERS, PHOTO-LITHOGRAPHER, WASHINGTON, D.C.

J. W. BATES & R. BORGERSRODE.
ANIMAL-TRAP.

No. 180,315.

3 Sheets—Sheet 3.

Patented July 25, 1876.

WITNESSES

INVENTOR

UNITED STATES PATENT OFFICE.

JOSEPH W. BATES, OF MINNEAPOLIS, MINNESOTA, AND RUDOLPH BORGERSRODE, OF PHILADELPHIA, PENNSYLVANIA.

IMPROVEMENT IN ANIMAL-TRAPS.

Specification forming part of Letters Patent No. 180,315, dated July 25, 1876; application filed December 23, 1875.

*To all whom it may concern:*

Be it known that we, JOSEPH W. BATES, of Minneapolis, Hennepin county, Minnesota, and RUDOLPH BORGERSRODE, of Philadelphia, in the county of Philadelphia, and in the State of Pennsylvania, have invented certain new and useful Improvements in Animal-Traps; and do hereby declare that the following is a full, clear, and exact description thereof, reference being had to the accompanying drawings, and to the letters of reference marked thereon, making a part of this specification.

The nature of our invention consists in the construction and arrangement of an animal-trap, as will be hereinafter more fully set forth.

In order to enable others skilled in the art to which our invention appertains to make and use the same, we will now proceed to describe its construction and operation, referring to the annexed drawings, in which—

Figure 1:
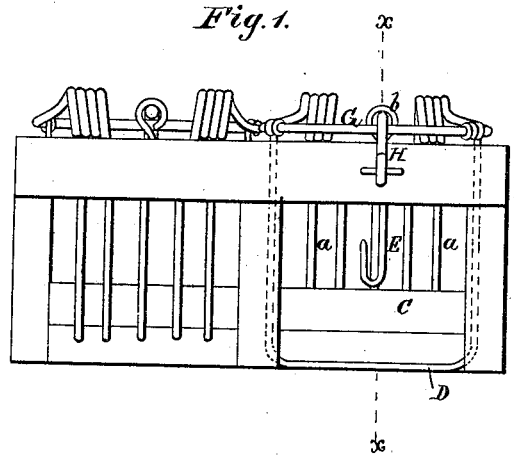
Figure 2:
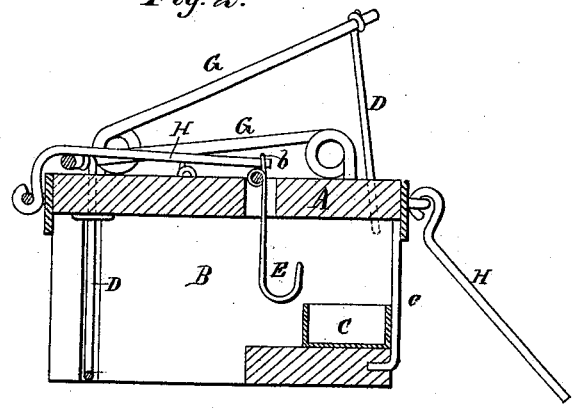
Figure 3:
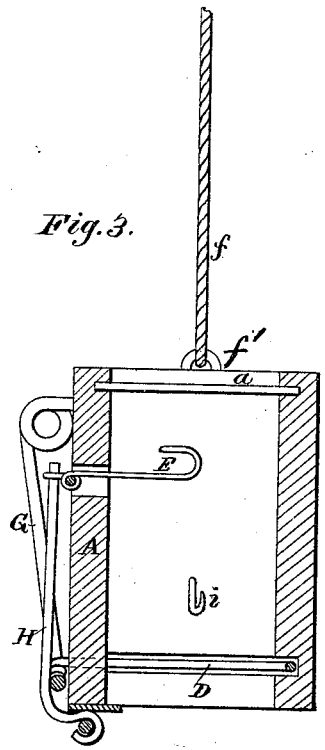
Figure 4:
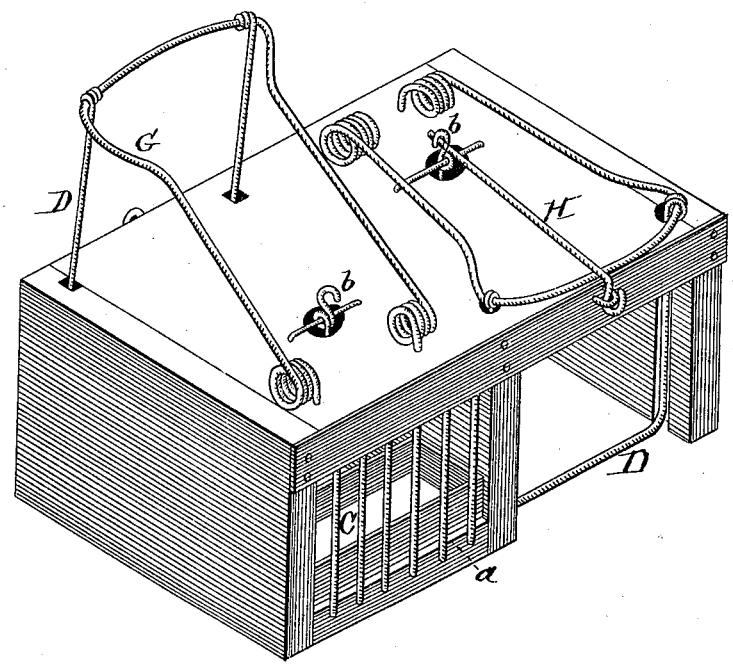

Figure 1 is a side elevation of our animal-trap when arranged double. Fig. 2 is a section of the same through the line $x$ $x$, Fig. 1. Fig. 3 is a vertical section of a single suspended trap. Fig. 4 is a perspective view of our trap.

A represents a box of any suitable dimensions, divided by a vertical partition, B, in two compartments, so as to form two traps in one. At opposite ends of the two compartments in the box A are secured gratings $a$, as shown, and against the inner side of such grating is placed a pan, C, to hold fresh water as a decoy-bait, especially on board ships, where fresh water forms the best decoy for rats.

The front portion of each compartment has the bottom removed, so that when the trap is placed on the ground the animal will encounter no obstruction in walking into the trap.

D represents a wire bail, the side arms of which pass through grooves in the sides of the trap, near the front end or entrance, and up through the top of the box, said arms being above the box, attached to a coiled wire spring, G, fastened on top thereof. In front of the decoy-bait box C in each compartment of the trap is suspended a hook, E, to receive the bait, the upper end of said hook passing through the top of the box, and formed with a loop or ring, $b$, at its top. On the front of the box is loosely attached a rod, H, as shown.

To set the trap, the spring G is pressed down, which brings the bail D down to the ground, and the rod H is then turned over the front end of the spring, and its end inserted in the loop or ring $b$. The animal being decoyed into the trap, in attempting to take the bait on the hook E, will move the same, so that the loop $b$ will pass off from the end of the rod H, releasing the spring G, which suddenly and forcibly springs upward with the bail. The bail catches the animal and chokes it to death.

For birds we use a single trap, suspended by a cord, $f$, or its equivalent, attached to the rings $f'$, as shown in Fig. 3, the grating $a$ being at the top, and the lower end open with the bail D therein. In the interior of this box is an extra hook, $i$, for suspending suitable decoy-bait, while the regular bait-hook E, that springs the trap, is located above the same.

Having thus fully described our invention, what we claim as new, and desire to secure by Letters Patent, is—

1. The combination, with the box A, divided into two compartments, and having entrances at opposite ends, of the gratings $a$ $a$ at opposite ends, decoy-bait boxes C C, bait-hooks E E, with loops or rings $b$ $b$, springs G G, bails D D, and rods H H, all substantially as and for the purposes herein set forth.

2. An animal-trap having the cord $f$ or its equivalent, the rings $f'$, the grating $a$ at its upper end, open at its lower end, and provided with interior decoy-bait hook $i$ and hook E, for springing the trap, all substantially as herein set forth.

In testimony that we claim the foregoing we have hereunto set our hands this 9th day of December, 1875.

JOSEPH W. BATES.
   RUDOLPH BORGERSRODE.

Witnesses:
 GEO. A. PARKER,
 ISAAC H. O'HARRA.